(12) United States Patent
Harris

(10) Patent No.: US 6,708,185 B2
(45) Date of Patent: Mar. 16, 2004

(54) SQL EXECUTION ANALYSIS

(75) Inventor: David Harris, Swadlincote (GB)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 09/968,913

(22) Filed: Oct. 3, 2001

(65) Prior Publication Data

US 2003/0033291 A1 Feb. 13, 2003

(51) Int. Cl.[7] .............................................. G06F 17/30
(52) U.S. Cl. ...................................... 707/104.1; 707/10
(58) Field of Search ............................... 707/1, 2, 3, 4, 707/5, 6, 7, 8, 9, 10

(56) References Cited

U.S. PATENT DOCUMENTS 6,339,769 B1 * 1/2002 Cochrane et al. ............... 707/2
6,356,887 B1 * 3/2002 Berenson et al. ............... 707/2

* cited by examiner

*Primary Examiner*—Diane D. Mizrahi
*Assistant Examiner*—Yicun Wu
(74) *Attorney, Agent, or Firm*—Swidler Berlin Shereff Friedman, LLP

(57) ABSTRACT

A method of collecting data relating to the manner in which a SQL statement referencing a database was executed and a computer program and computer program product implementing the method are provided. The method comprises obtaining an execution plan and associated performance factors for the SQL statement, obtaining predetermined statistical data relating to the database referenced by the SQL statement, generating at least one output file containing the SQL statement, the execution plan, the performance factors and the predetermined statistical data, and generating a SQL script which enables the predetermined statistical data to be recreated when executed on a second database, wherein the SQL script is executed on the second database to recreate the predetermined statistical data on the second database and wherein the SQL statement is analyzed by executing it on the second database after recreating the predetermined statistical data.

21 Claims, 2 Drawing Sheets

SQL EXECUTION ANALYSIS

FIELD OF THE INVENTION

This invention relates to a method of analysing the manner in which an SQL statement referencing a database was executed.

DESCRIPTION OF THE PRIOR ART

SQL statements are conventionally executed by a database using a rules-based approach. However, it is becoming increasingly common for them to be executed according to a cost-based approach. For example, the Oracle® database includes a cost-based optimiser for executing SQL statements according to a cost based approach and an example of how this operates is set out below.

In this example, there is a table called ORDERS with 2 million rows having an indexed column called ORDER_STATUS. The indexing of this column provides the database with fast, direct access to the ORDER_STATUS column. Each of the rows in the table contains one of four values in the ORDER_STATUS column. These are "COMPLETED", "AWAITING STOCK", "AWAITING DISPATCH" and "CANCELLED" and the percentage of rows containing each value is 95%, 1%, 2% and 2% respectively.

If the SQL statement:
SELECT * FROM ORDERS WHERE ORDER_STATUS= "COMPLETED"
is issued to the database for execution using a rules-based approach then the database will access the ORDER_STATUS column using its index and will read 3.8 million rows since each row where ORDER_STATUS is "COMPLETED" will be accessed twice.

If, however, the statement is executed using a cost based approach, the cost-based optimiser will obtain the proportion of rows in the ORDERS table which have an ORDER_STATUS of "COMPLETED" from a set of statistics relating to the ORDERS table. From this it will determine that nearly all the rows have an ORDER_STATUS of "COMPLETED" and that the fastest approach to execute this statement is to access every row in the table and discard those rows that do not have an ORDER_STATUS of "COMPLETED".

Similarly, if the above SQL statement is modified such that it reads:
SELECT * FROM ORDERS WHERE ORDER_STATUS= "CANCELLED"
then the optimiser will, using the set of statistics, determine that the best approach in this instance is to access the column via its index and then extract all rows with an ORDER_STATUS of "CANCELLED".

This example shows that execution of SQL statements using a cost-based approach is extremely reliant on the accuracy of the set of statistics used to determine the best execution plan for the statement. Furthermore, each database has its own unique set of statistical data for use by the cost-based optimiser and hence, it is difficult for remote support teams to ascertain why the cost-based optimiser is choosing certain execution plans and to investigate the slow execution of SQL statements relating to poor choice of execution plan by the cost-based optimiser. Presently, collection of statistical data is very time consuming and is not performed in a standard manner.

SUMMARY OF THE INVENTION

In accordance with one aspect of the present invention, there is provided a method of collecting data relating to the manner in which a SQL statement referencing a database was executed, the method comprising:
 a. obtaining an execution plan and associated performance factors for the SQL statement;
 b. obtaining predetermined statistical data relating to the database referenced by the SQL statement; and,
 c. generating at least one output file containing the SQL statement, the execution plan, the performance factors and the predetermined statistical data.

Hence, the invention provides a standard way of obtaining the statistical data used by the cost-based optimiser and the execution plan for the statement along with performance factors for the execution plan and providing these to a remote support team such that they can investigate any problems associated with the execution of the SQL statement.

Typically, the execution plan for the SQL statement is obtained by extracting the SQL statement from a trace output file, which contains the SQL statement and a partial execution plan along with information relating to the database accesses performed by the SQL statement, and presenting the SQL statement to the database with a command to produce the execution plan.

It is desirable for database initialisation parameters to be stored in the at least one output file so that the support team can determine whether these have had an effect on the execution of the SQL statement.

In the case of the Oracle® database, these database initialisation parameters relate to the cost-based optimiser and are used to configure various cost-based optimiser settings.

Typically, the performance factors comprise one or more of cost, cardinality and data size parameters. The cost parameter is a figure of merit used to indicate the quantity of database accesses required to execute the statement. The cardinality parameter is an estimate of the number of rows that the SQL statement is expected to generate and the data size parameter, also called the byte parameter, is the product of the cardinality parameter and the average number of bytes per row and indicates how many bytes will be generated by the SQL statement.

Typically, data relating to a plurality of SQL statements is collected and, in this case, the number of SQL statements for which data is collected may be limited to a predefined value.

Optionally, the predetermined statistical data may be stored in a database table.

As a further option, an SQL script may be generated which enables the predetermined statistical data to be recreated when the script is executed on a second database.

Preferably, such an SQL script is executed on the second database in order to recreate the predetermined statistical data on the second database.

There is also provided a method of analysing the manner in which a SQL statement was executed by executing the SQL statement on the second database after the predetermined statistical data has been recreated on the second database either by executing the SQL script on the second database or by transferring the database table to the second database.

The invention will typically be provided as a computer program comprising computer program code means adapted to perform all the steps of the first aspect of the invention when said program is run on a computer.

Further, there may be provided a computer program product comprising program code means stored on a computer readable medium for performing a method of the first aspect of the invention when said program product is run on the computer.

BRIEF DESCRIPTION OF THE DRAWINGS

An example of the invention will now be described with reference to the accompanying drawings, in which.

DETAILED DESCRIPTION OF THE EMBODIMENT

For the purposes of this example, the ORDERS table previously described will be used. This table is used, in this example, to refer to the orders taken by a company during the first quarter of the year. The progress status of these orders is checked on a daily basis by running the following SQL script:

SELECT * FROM ORDERS WHERE ORDER_STATUS= "COMPLETED"
SELECT * FROM ORDERS WHERE ORDER_STATUS= "AWAITING STOCK"
SELECT * FROM ORDERS WHERE ORDER_STATUS= "AWAITING DISPATCH"
SELECT * FROM ORDERS WHERE ORDER_STATUS= "CANCELLED"

At the time when the set of statistics used by the cost-based optimiser relating to the ORDERS table are generated, there is a severe shortage of stock and hence, the statistics are as shown below:

| ORDER_STATUS | PERCENTAGE |
| --- | --- |
| COMPLETED | 13% |
| AWAITING STOCK | 75% |
| AWAITING DISPATCH | 10% |
| CANCELLED | 2% |

Since the statistics are up to date, the cost-based optimiser can select a suitable execution plan for each of the SQL statements in the above SQL script, which then executes efficiently.

Subsequently, the shortage of stock is rectified and the distribution of values of ORDER_STATUS within the ORDERS table are as shown below:

| ORDER_STATUS | PERCENTAGE |
| --- | --- |
| COMPLETED | 68% |
| AWAITING STOCK | 2% |
| AWAITING DISPATCH | 25% |
| CANCELLED | 5% |

However, the set of statistics used by the cost-based optimiser in order to select the execution plan has not been updated. Hence, the cost-based optimiser does not use the ideal execution plans for the first and second lines of the SQL script. Instead, it determines that the best execution plan for the first line is to access the column by its index and then extract each row where ORDER_STATUS= "COMPLETED" and that the best execution plan for the second line is to extract all rows of the ORDERS table and discard those where ORDER_STATUS is not "AWAITING STOCK".

As such, the execution of the SQL script becomes very time consuming. In order that a remote support team can ascertain why the script is executing slowly, the process described below, which makes reference to FIGS. 1 and 2, is carried out.

Figure 1:
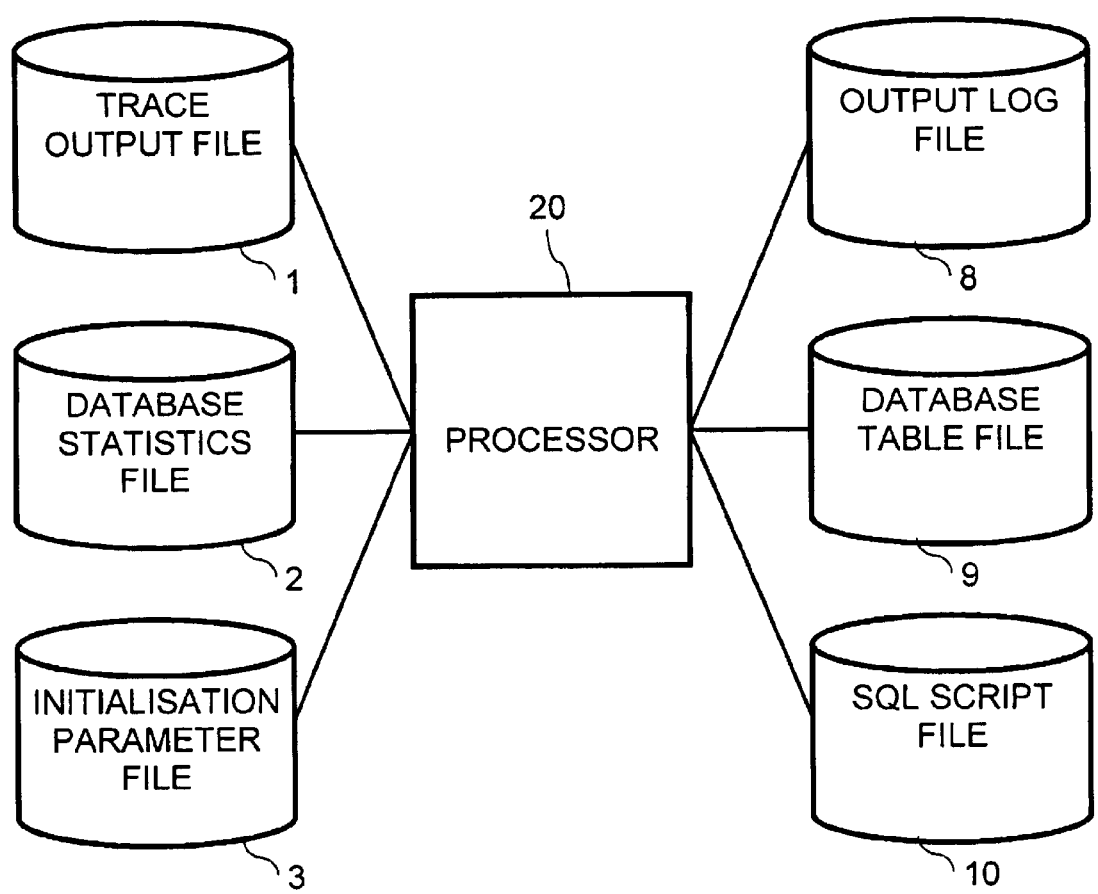
FIG. 1 shows suitable apparatus for performing the example.
Figure 2:
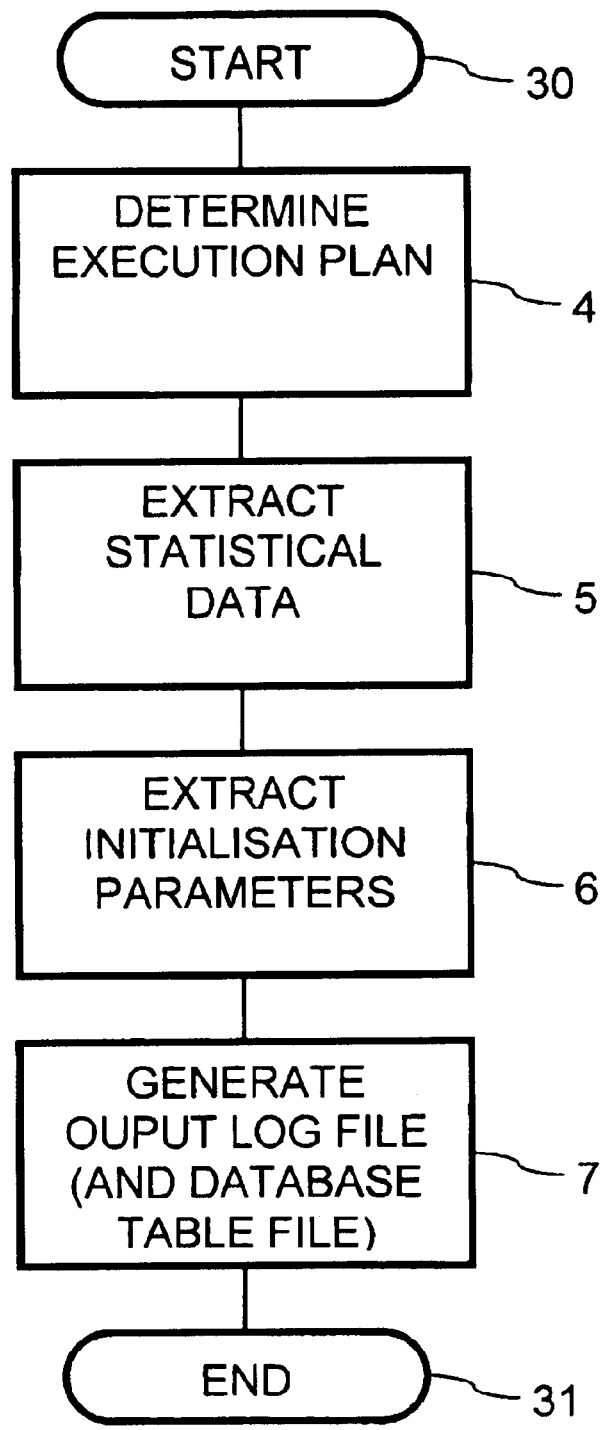
FIG. 2 is a flowchart of the example.

FIG. 1 shows a processor 20 adapted to perform a method in accordance with the process illustrated by the flowchart of FIG. 2. The processor 20 can extract data from a trace output file 1, a database statistics file 2 and a cost-based optimiser initialisation parameter file 3 and can create from these data an output log file 8, a database table file 9 and a SQL script file 10.

The flowchart of FIG. 2 will now be described with reference to the above example.

Firstly, the SQL statements are extracted from trace output file 1 and an execution plan is determined for each SQL statement in process step 4 by presenting the SQL statement to the cost-based optimiser which returns the execution plan for the SQL statement along with the associated cost, cardinality and byte parameters.

The trace output file 1 is created by the database when the SQL script is executed. It contains the SQL statements along with a partial execution plan and information relating to the database accesses performed by the SQL statement.

The statistical data relating to the ORDERS table that is used by the cost-based optimiser in order to generate the execution plan is then extracted from a database statistics file 2 in process step 5 and the initialisation parameters relating to the cost-based optimiser are extracted in process step 6 from a cost-based optimiser initialisation parameter file 3.

The output of process step 4 and the data extracted by process steps 5 and 6 are combined in process step 7 which generates an output log file 8 containing the SQL statements, the execution plans and the cost, cardinality and byte values that are determined in process step 4 along with the statistical data relating to the database and the cost-based optimiser initialisation parameters.

Optionally, process step 7 can also generate a database table file 9 containing the statistical data extracted by process step 5 and an SQL script file 10 can be generated with the purpose of recreating the statistical data when executed on a second database.

Start and end terminators 30, 31 for the flowchart are also shown in FIG. 2 for clarity.

The output log file 8, database table file 9 and SQL script file 10 are then supplied, for example by electronic mail, to the remote support team for analysis. In this instance, inspection of the output log file 8 will show that the statistical data relating to the ORDERS table is out of date. This is determined by examining the execution plan with the cost, cardinality and byte values together with the corresponding statistical data relating to the ORDERS table and its indices. The statistical data can then be regenerated to rectify the problem.

With more complicated examples it may be necessary to recreate the statistical data relating to the database from the database table 9 or SQL script 10 such that the execution of the SQL statements can be simulated. In the present example, they could be used by the remote support team to generate a local database table representative of the ORDERS table containing the salient items of data, in this case the correct number of rows and the ORDER_STATUS column with index. This would create a table in accordance with the original statistical data relating to the ORDERS table and hence, the SQL script would run efficiently. Again, this would highlight that the statistical data relating to the ORDERS table in use by the company was inaccurate and the course of remedial action described above could be advised.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out the distribution. Examples of computer readable media include recordable-type media such as floppy disc, a hard disc drive, RAM and CD-ROMs as well as transmission-type media, such as digital and analogue communications links.

We claim:

1. A method of collecting data relating to the manner in which a SQL statement referencing a database was executed, the method comprising:
   a. obtaining an execution plan and associated performance factors for the SQL statement;
   b. obtaining predetermined statistical data relating to the database referenced by the SQL statement;
   c. generating at least one output file containing the SQL statement, the execution plan, the performance factors and the predetermined statistical data; and
   d. generating a SQL script which enables the predetermined statistical data to be recreated when executed on a second database, wherein the SQL script is executed on the second database to recreate the predetermined statistical data on the second database and wherein the SQL statement is analysed by executing it on the second database after recreating the predetermined statistical data.

2. A method according to claim 1, wherein the execution plan for the SQL statement is obtained by extracting the SQL statement from a trace output file, which contains the SQL statement and a partial execution plan along with information relating to the database accesses performed by the SQL statement, and presenting the SQL statement to the database with a command to produce the execution plan.

3. A method according to claim 1, further comprising storing database initialisation parameters in the at least one output file.

4. A method according to claim 1, wherein the performance factors comprise one or more of cost, cardinality and data size parameters.

5. A method according to claim 1, wherein data relating to a plurality of SQL statements is collected.

6. A method according to claim 5, wherein the number of SQL statements for which data is collected is limited to a predefined value.

7. A method according to claim 1, further comprising storing the predetermined statistical data in a database table.

8. A computer program comprising computer program code adapted to perform the following steps when said computer program is run on a computer:
   a. obtaining an execution plan and associated performance factors for the SQL statement;
   b. obtaining predetermined statistical data relating to the database referenced by the SQL statement; and,
   c. generating at least one output file containing the SQL statement, the execution plan, the performance factors and the predetermined statistical data; and
   d. generating a SQL script which enables the predetermined statistical data to be recreated when executed on a second database, wherein the SQL script is executed on the second database to recreate the predetermined statistical data on the second database and wherein the SQL statement is analysed by executing it on the second database after recreating the predetermined statistical data.

9. A computer program product comprising program code stored on a computer readable medium for performing the following steps when said computer program product is run on a computer:
   a. obtaining an execution plan and associated performance factors for the SQL statement;
   b. obtaining predetermined statistical data relating to the database referenced by the SQL statement; and,
   c. generating at least one output file containing the SQL statement, the execution plan, the performance factors and the predetermined statistical data; and
   d. generating a SQL script which enables the predetermined statistical data to be recreated when executed on a second database, wherein the SQL script is executed on the second database to recreate the predetermined statistical data on the second database and wherein the SQL statement is analysed by executing it on the second database after recreating the predetermined statistical data.

10. A computer program according to claim 8, wherein the execution plan for the SQL statement is obtained by extracting the SQL statement from a trace output file, which contains the SQL statement and a partial execution plan along with information relating to the database accesses performed by the SQL statement, and presenting the SQL statement to the database with a command to produce the execution plan.

11. A computer program according to claim 8, further comprising storing database initialisation parameters in the at least one output file.

12. A computer program according to claim 8, wherein the performance factors comprise one or more of cost, cardinality and data size parameters.

13. A computer program according to claim 8, wherein data relating to a plurality of SQL statements is collected.

14. A computer program according to claim 13, wherein the number of SQL statements for which data is collected is limited to a predefined value.

15. A computer program according to claim 8, further comprising storing the predetermined statistical data in a database table.

16. A computer program product according to claim 9, wherein the execution plan for the SQL statement is obtained by extracting the SQL statement from a trace output file, which contains the SQL statement and a partial execution plan along with information relating to the database accesses performed by the SQL statement, and presenting the SQL statement to the database with a command to produce the execution plan.

17. A computer program product according to claim 9, further comprising storing database initialisation parameters in the at least one output file.

18. A computer program product according to claim 9, wherein the performance factors comprise one or more of cost, cardinality and data size parameters.

19. A computer program product according to claim 9, wherein data relating to a plurality of SQL statements is collected.

20. A computer program product according to claim 19, wherein the number of SQL statements for which data is collected is limited to a predefined value.

21. A computer program product according to claim 9, further comprising storing the predetermined statistical data in a database table.

* * * * *

UNITED STATES PATENT AND TRADEMARK OFFICE
CERTIFICATE OF CORRECTION

PATENT NO.     : 6,708,185 B2
DATED          : March 16, 2004
INVENTOR(S)    : David Harris It is certified that error appears in the above-identified patent and that said Letters Patent is hereby corrected as shown below:

<u>Title page,</u>
Insert Item -- [30] Foreign Application Priority Data
              August 3, 2001 (British)…………….. 0119021.4 --

Signed and Sealed this

Eighteenth Day of May, 2004

JON W. DUDAS
*Acting Director of the United States Patent and Trademark Office*